United States Patent
Andreasen

(10) Patent No.: US 6,784,666 B2
(45) Date of Patent: Aug. 31, 2004

(54) FLEXIBLE CUSHION PROBE FOR DETECTING A DIELECTRIC MEDIUM DEFINED BY A DIELECTRIC BOUNDARY SURFACE

(76) Inventor: Frank Erik Andreasen, Nakakovvej 16, Veddelev, Roskilde (DK), 4000

(*) Notice: Subject to any disclaimer, the term of this patent is extended or adjusted under 35 U.S.C. 154(b) by 0 days.

(21) Appl. No.: 10/269,049

(22) Filed: Oct. 11, 2002

(65) Prior Publication Data

US 2003/0052686 A1 Mar. 20, 2003

Related U.S. Application Data

(63) Continuation of application No. PCT/DK01/00257, filed on Apr. 10, 2001.

(30) Foreign Application Priority Data

Apr. 13, 2000 (DK) .......................... 2000 00631

(51) Int. Cl.[7] ................................................ G01V 3/08
(52) U.S. Cl. ..................... 324/338; 324/220; 324/329
(58) Field of Search .................. 324/334, 337, 324/338, 339, 220, 326, 327, 328, 329

(56) References Cited

U.S. PATENT DOCUMENTS

| 4,422,043 A | 12/1983 | Meador | 324/338 |
|---|---|---|---|
| 5,138,263 A | 8/1992 | Towle | 324/338 |
| 5,157,331 A | 10/1992 | Smith | 324/338 |
| 5,212,495 A | 5/1993 | Winkel et al. | 343/872 |
| 5,530,359 A | 6/1996 | Habashy et al. | 324/338 |

FOREIGN PATENT DOCUMENTS

| DE | 4017238 | 12/1991 |
|---|---|---|
| EP | 0723067 A2 | 7/1996 |
| GB | 2 156 527 A | 10/1985 |
| GB | 2 166 599 A | 5/1986 |

*Primary Examiner*—Jay Patidar
(74) *Attorney, Agent, or Firm*—Winston & Strawn LLP

(57) ABSTRACT

A probe serving for detecting the structure of a dielectric medium. The probe includes at least one transmitter/receiver antenna located near a dielectric boundary surface that defines a dielectric medium, and a signal processor for receiving signals from the antenna and generating data representative of the structure of the dielectric medium. Between the antenna and the face is inserted a cushion of a material having a dielectric number higher than that of the air. In one embodiment, the probe is adapted to inspect if there is a void in the soil around a dielectric pipe, for example a sewer pipe. In this case, the probe is guided inside the pipe with the antennas located on a shaft mounted on the probe with the same axis as the axis of the pipe. Due to the presence of the cushion, an optimally good connection between the antennas and the face defining the dielectric medium is obtained. A probe arranged to detect inside for example a sewer pipe can be designed in such a way that it is possible to obtain a randomly dense measurement covering of the internal face of the pipe and the surrounding layer of soil. The measuring density is defined by changing the measuring frequency, rate of advance and the angle of the probe in relation to perpendicular.

18 Claims, 3 Drawing Sheets

FLEXIBLE CUSHION PROBE FOR DETECTING A DIELECTRIC MEDIUM DEFINED BY A DIELECTRIC BOUNDARY SURFACE

CROSS-REFERENCE TO RELATED APPLICATIONS

This application is a continuation of International application no. PCT/DK01/00257 filed Apr. 10, 2001, the entire content of which is expressly incorporated herein by reference thereto.

BACKGROUND ART

The invention relates to a probe for detecting a dielectric medium defined by a face and comprising at least one transmitter/receiver antenna located near the face, a signal processor for receiving signals from the antenna and generating data representative of the structure of the dielectric medium, and a dielectric material located between the at least one transmitter/receiver antenna and the boundary surface.

In particular, although not exclusively, the invention relates to a probe for detecting voids in the soil around a pipe, such as e.g. a sewer pipe.

By the term "detected", it is in the above sense to be understood that the dielectric face and the dielectric medium are inspected, measured, analysed and described, the latter by means of e.g. data and/or images.

It is well known that voids can be formed around a sewer pipe. Formation of voids typically arise by sediment being washed into a leaky pipe because this pipe is functioning as drain. In connection with heavy rain, the water pressure in the pipe will often exceed the water pressure in the surrounding sediment whereby water is flowing out of the pipe. On its way back into the pipe, the water will bring along sediment.

A void, once formed, is in time likely to grow resulting in the fact that depressions are formed in the overlying ground. If the ground surface is covered with asphalt or concrete, the void can gradually assume a substantial size before the damage really appears.

Furthermore, the voids are often popular habitats and breeding grounds for rats. However, the rats are not efficiently exterminated without knowledge of the existence and location of the voids.

The voids are difficult and often impossible to reveal by detection from the ground surface. The problem cannot be solved by means of a video camera guided through the pipe either. By means of a video camera, it is possible to observe the inside of the pipe but not areas outside the pipe. For example, a bad and leaking joint cannot always be seen with a video camera.

Instead, these voids are therefore attempted to be revealed and localized by detection from within the pipe using probes designed for this specific purpose.

Such a probe is known from EP 0 816 872 A1. In this case, a number of antennas are placed along the periphery of the probe. A signal processor is furthermore part of the probe for generating three-dimensional images of the signals from the antennas.

The known probe operates with a radar which is able to transmit signals through the wall of the pipe. On its way through the pipe, the probe is thus emitting radar signals into the surrounding soil at short time intervals and detecting the returned radar signals. The signal processor converts the signals into data representative of the structure in the soil around the location in the pipe where the probe or rather its antennas are at a given moment.

If the soil around the pipe is homogeneous and without other objects, the data recorded during the travel of the probe through the pipe will assume an even and regular character. Conversely, deviations are signs that there are voids or objects in the soil of divergent electric properties (permittivity). Normally, the voids and objects can be distinguished from one another on the diversity of the data.

The known probe makes use of several closely set antennas. Thereby, the advantage is obtained in that it is only necessary to guide the probe through the pipe one time in order to at least essentially detect abnormal conditions in the ground around the pipe.

However, the number of antennas is limited by the modest space left when many antennas in this way must be placed closely next to each other along the periphery of the probe. This is especially a problem in case of small pipe dimensions.

Another disadvantage is that it is not possible freely to choose the location of the measuring profile or the closeness between the profiles by means of this probe. Moreover, the measurements are limited to only be able to take place along the pipe as the probe cannot be made to rotate in the pipe on a given location for example in order to check a joint and possible corrosion in the top and/or bottom of the pipe.

Theoretically, the antennas can be located in direct contact with the wall of the pipe. However, since a pipe normally does not have the precise same inside diameter in all cross sections, such a positioning is however not always possible in practice.

However, it is possible to compensate for the varying and imprecise inside diameter of a given pipe by letting the antennas be spring-loaded and dragging them along the inside face of the pipe. Since pipes of e.g. concrete often have a rough and uneven inside face, this solution is only suitable for minor inspections where the inevitable wearing of the antennas is not of great importance.

In practice, there must therefore be a gap conventionally filled with air between the transmitter/receiver antennas and the inside face of the pipe. However, the existence of such a gap reduces the effect of the signals penetrating into the ground around the pipe. Another detrimental effect is that undesirable reflections from the wall of the pipe are generated in addition to the desired reflections.

A preferred antenna type would be a high-frequency shielded dipole antenna. These antennas are normally arranged for direct connection with the base, that is the distance between the medium being checked and the antenna must be as short as possible. Even if the antenna is spring-loaded, it will be necessary to have a certain distance between the antenna and e.g. the inside face of the sewer pipe due to oval pipes, staggered joints etc. as the probe otherwise could get stuck too frequently.

However, an increased distance between the inside face of the sewer pipe and the antenna increases the surface reflections. Apart from a smaller effect in the part of the signal penetrating the pipe and into the ground, it also has the effect of reflections being generated inside the pipe from the probe and the inside face of the pipe. These undesired reflections can be removed during subsequent signal processing to some extent but they still degrade the final measuring results.

GB 2 166 599 A discloses an electromagnetic detector system for detecting the layers surrounding a horizontal borehole. Above an antenna which is part of the system, a dielectric material is located with a dielectric constant mainly corresponding to the dielectric constant of the surrounding layers.

U.S. Pat. No. 5,138,263 discloses a drill string for measuring the electric properties of an earth formation surrounding the borehole. For this purpose, a transmitting antenna is used for generating electromagnetic waves and at least two receiving antennas for receiving the reflected electromagnetic waves. The antennas are covered by an elastomeric layer which is located in a groove in the drill string. The layer is serving for protecting the antennas against shocks and abrasive contaminants.

In both of these patent documents, transmission of the signals takes place via a gap between the respective probe and the boundary surface resulting in the aforesaid disadvantages.

Furthermore, German Patent Publication DE 40 17 238 A1 discloses a method and a device for detecting e.g. a concrete pipe and its surroundings. In this case, an antenna is located rotatably on a shaft mounted on a vehicle only shown schematically. It is mentioned that the axis of the shaft coincides with the axis of the pipe but the publication does not mention any means for achieving this. By means of the arrangement shown only schematically in the drawing, it is however not possible to obtain a fairly regular, constant distance between the antenna and the inside face of the pipe, and the antenna must therefore be located at an adequate distance from the inside face of the pipe.

The present invention now provides a device and method that overcomes the problems of the prior art.

SUMMARY OF THE INVENTION

The present invention provides a system that provides an improved connection between the antennas of a detection probe probe and a dielectric boundary surface. The probe comprises at least one transmitter/receiver antenna located near the surface, a signal processor for receiving signals from the antenna and generating data representative of the structure of the dielectric medium, and a dielectric material located between the at least one transmitter/receiver antenna and the boundary surface.

The probe of the invention is arranged to be able to utilize the capacity of the antennas optimally and which is selectively able to detect the surroundings of a given pipe. Also, the preferred probes of the invention have a simple and inexpensive design.

The novel and unique features according to the invention are achieved by configuring the dielectric material of the probe as a flexible cushion in contact with or near the boundary surface of the dielectric material while detection takes place. An improved connection between e.g. the inside face of a sewer pipe and an antenna located at a distance from this inside face can be achieved when the cushion is made of a material that has a dielectric number that is higher than that of the air and smaller than that of the soil around the pipe.

The cushion can advantageously be laminated so that a stepped or gradual increase of the dielectric number out towards the surroundings is obtained. The cushion, which is mounted on or around the antenna, has the effect that as much as possible of the transmitted signal penetrates out into the surrounding soil. At the same time, the amount of undesired reflexes from the opposite side of the pipe is reduced. In addition, the cushion has the advantageous effect that the antenna is spared destructive shocks and vibrations, and that the probe is not likely to get stuck in the pipe.

In a simple embodiment, the cushion can be a watertight bag that contains a mixture of air and water. The desired dielectric number is achieved by mixing air and water in adequate proportion. This bag can typically be made of a suitable, impermeable plastic or rubber material to ensure that the contents of the bag retains the desired amount of water and that the dielectric number thereby maintains at the predetermined value.

Especially along the attrition face towards the often rough and uneven pipe wall, the bag can be reinforced with an abrasion-proof material of e.g. woven nylon. Alternatively, a laminate with e.g. polyethylene on the inside and nylon on the outside can be used.

In an advantageous embodiment, a material can be provided in the bag. Advantageously, this material is a water-absorbing foam of plastic or rubber having an open cell structure. This foam can be in form of a sponge or it can be particular. The water-absorbing material or foam is made to absorb so much water that the desired dielectric number is achieved.

An even and uniform distribution of the water in the water-absorbing material is achieved when a fine-grained foam having good capillary properties is used. In order to increase viscosity and give the water-absorbing material or foam an adequate elasticity, the water can furthermore be added a polymer which can give the water phase an advantageous gelatinous consistency if desired.

When the foam with the open cell structure is particular, it can be mixed with particular foam having a closed cell structure. The foam particles having the open cell structure are made to absorb water, and the two kinds of particles, which have to be small in relation to the applied wavelength, are mixed in a proportion corresponding to the desired dielectric number. Where the cushion is used for dampening radar signals, the water phase can advantageously consist of a saline solution.

In some cases it would be desirable to be able to vary the dielectric number of a given cushion. For this purpose the probe can comprise means for variably be able to compress the flexible cushion. Thereby, the air-liquid phase ratio in the bag is altered and thus the dielectric number. This solution is suitable for e.g. inspecting a road surfacing or concrete construction.

As it appears, the flexible cushion according to the invention advantageously fills the gap between the antenna and the inside face of the pipe.

In practice, for example the cross section of the sewer pipes however differs more or less from a completely circular form. Furthermore, the pipes will usually have an uneven inside face and sometimes projecting edges at the joints.

If the probe is guided forward in the pipe in the conventional way described for example in German Patent Publication DE 40 17 238 A1, where the antenna is located on a shaft which can rotate about an axis, there is therefore a risk that the flexible cushion in some situations could lose contact with the inside face of the pipe so that the desired, optimal effect is not achieved. In other cases, the flexible cushion can be damaged by jamming against the inside face of the pipe or being more or less torn on a projecting or sharp edge.

According to the invention, by journaling the shaft in two bearings located on each their movable support one of which can be an automotive tractor and the other a carriage, the above-mentioned imperfections of the pipe are equalized. This carriage controls the shaft whereas the tractor pulls or pushes the carriage. The two independent supports ensure that the shaft is always centred in the best possible way in the pipe and that each antenna therefore is secured a mainly constant distance to the inside face of the pipe even if the cross sections and surfaces that the antenna encounters on its way through the pipe vary to a greater and smaller extent. This equalizing effect is especially effective when the distance between the supports of the shaft is relatively large.

By means of the above equalizing method according to the invention, two very important advantages are obtained namely that the antennas and cushions will be operating mainly under the same conditions in all angular positions and that the cushions on the whole are spared being damaged. Having this design, the probe is able to detect the soil around a pipe with merely one directional antenna in an area of 360° with random measuring density.

In order to further ensure the correct positioning of the antenna in the pipe, a balance weight can be mounted on the shaft for counterbalancing the weight of the antenna. However, this balancing is not quite effective when the pipe is filled more or less with sewage water which affects the balance weight with a variable buoyant power. According to the invention, the shaft can therefore instead be divided into two shaft parts which are arranged to rotate in different directions at the same speed, at the same time a first antenna can be placed on one of the shaft parts and a second antenna on the second shaft, and the two antennas can, in a specific angular position of each of the two shaft parts, be symmetrically placed around a vertical plane comprising the axis of rotation. Thereby, the two antennas will balance each other out in each angular position even if the pipe is filled more or less with sewage water.

When both a tractor and a carriage having each their bearing of the shaft are used for supporting the shaft, the entire probe will be so long that it cannot or only with difficulty can be guided down into a pipe via a well without being articulated. According to the invention, this articulation can advantageously be made by means of at least one horizontally oriented swivel bearing and at least one vertically oriented swivel bearing.

With a view to absorb or dampen undesired reflexes in the pipe, a material can be fitted on the inside of the antenna for absorbing signals reflected from the wall of the pipe. Furthermore, a material can be fitted around the shaft carrying the antenna for absorbing reflected radar signals inside the pipe. For this purpose any kind of material can be used that is well suited for absorbing the reflected radar signals at the respective frequencies.

In a preferred embodiment, a cushion is used which is of the same type as the one described above, but with the difference that the water is replaced by a saline solution and that the dielectric number is kept at a value adequately low to ensure that the reflection from the cushion surface is the least possible and that the penetration and absorption of the signals the greatest possible.

The design of the probe permits accurate measurement of chosen cross sections of a pipe. This kind of measurement can e.g. serve for localization of damages at a joint, measurement of variations with regard to corrosion, erosion in a concrete pipe or localization of a service line behind a sleeve lining.

The probe can moreover have several antennas located at mutual angular distances on the shaft of the probe. Thereby, the number of run-throughs for measurements can be reduced considerably. Furthermore, the antennas can be displaced in relation to each other along the axis of rotation.

As the probe is operating with one or just a small number of antennas, it is moreover simple and inexpensive to manufacture.

BRIEF DESCRIPTION OF THE DRAWINGS

The invention will be explained in greater detail below, describing only exemplary embodiments with reference to the drawing, in which.

DETAILED DESCRIPTION OF PREFERRED EMBODIMENTS

Figure 1:
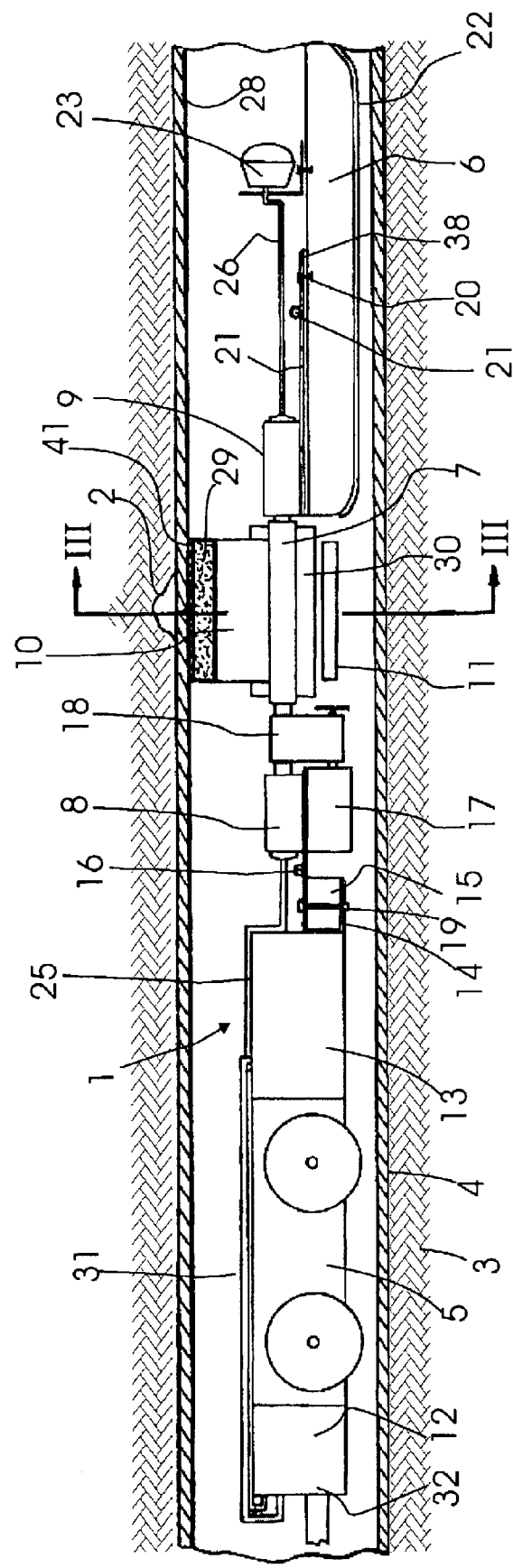
FIG. 1 is a side elevational view of a probe according to the invention in a fractionally shown pipe partly in section.

In the following, the invention is described on the assumption that it relates to a probe 1 which by means of a radar is to inspect whether or not there is a void 2 in the soil 3 around a sewer pipe 4 of concrete.

The main components of the probe are in the present case an automotive tractor 5, a front carriage 6, a shaft 7 rotatably journaled in shaft bearings 8 and 9 on the tractor 5 and the carriage 6 respectively, and a transmitter/receiver antenna 10 mounted on the shaft 7 and counterbalanced by a balance weight 11.

Instead of an automotive tractor and carriage, the probe can alternatively be provided with two carriages and be pulled by means of a wire rope drive (not shown).

The tractor must have an adequate weight to be able to stably keep itself upright in the bottom of the pipe and to be able to produce the required traction power to be able to pull the probe and a main cable 32 by means of the wheel contact with the pipe. If necessary, the weight can be increased to a desired value by means of an extra ballast (not shown).

A cable joint box 12, an instrument box 13 and a console 14, which via a distance piece 15 and a horizontal hinge 16 is carrying the shaft bearing 8, are located on the tractor 5.

On the horizontal hinge 16, a gear motor 17 is moreover mounted which directly driven (not shown) or as shown in the drawing via a belt drive 18, can rotate the shaft 7 an angle of at least 360°. At the distance piece 15, the hinge 16 is moreover connected to the console 14 via a vertical bearing 19. Alternatively, the gear motor can be mounted in direct continuation of the shaft.

In the front carriage 6 which is made of a nonconductive material such as e.g. fibre glass or plastic, a second horizontal hinge 21 carrying the shaft bearing 9 is mounted via a second bearing 20.

The carriage is provided with runners 22 of an abrasion-proof material of small coefficient of friction, for example nylon. Thereby, the carriage is permitted to slide easily across the inside face of the pipe during which the carriage is stably keeping the probe in a desired angular position in the pipe.

The design of the carriage has the effect of the vibrations and shakings that might be caused during the advance of the probe in the pipe, being kept at a low level in the area where the antenna is located and that water in the pipe is permitted to pass the carriage freely besides or under it. Furthermore, sediment in the bottom of the pipe does not affect the movements of the carriage.

The vertical bearings 19 and 20 divide the probe into three joints that can rotate in relation to each other in a horizontal plane. The probe is therefore able to operate in pipes that are not straight.

On the carriage, a video camera 23 is moreover fitted for via a television screen 24 (FIG. 2) additionally be able to inspect the inside face of the pipe and observe if the antenna is in the right position in the pipe. The camera is connected to the cable joint box 12 by means of a video cable 26 passed through an axially extending hole 27 (FIG. 3) in the axle 7.

Figure 3:
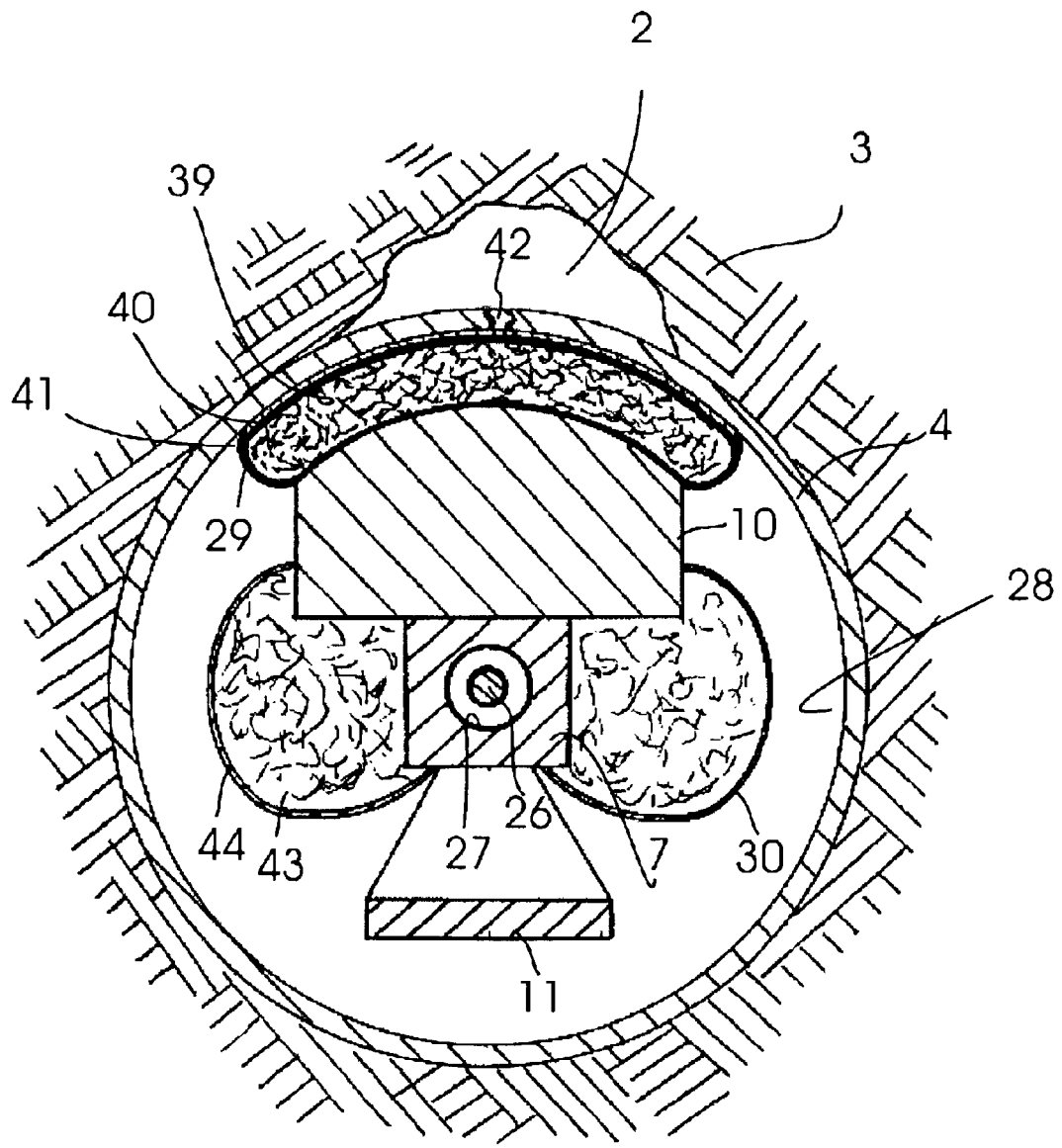
FIG. 3 is on a larger scale a sectional view taken along the line III—III of FIG. 1.

As shown in FIGS. 1 and 3, the antenna 10 is located at a distance from the inside face 28 of the pipe. The thus formed gap between the antenna and the inside face is filled by a first cushion 29. A second cushion 30 can moreover be fitted around the shaft 7. The function of the two cushions will be explained below.

The antenna 10 is connected to the cable joint box 12 via the instrument box 13 by means of an antenna cable 31. The main cable 32 fragmentarily shown in FIG. 1 connects the cable joint box 12 to a station on the ground surface.

All the cables which are part of the probe are joined in the main cable 32. These cables are the video cable 26, the antenna cable 31, and a number of not-shown cables for controlling and supplying the probe with electric power.

Figure 2:
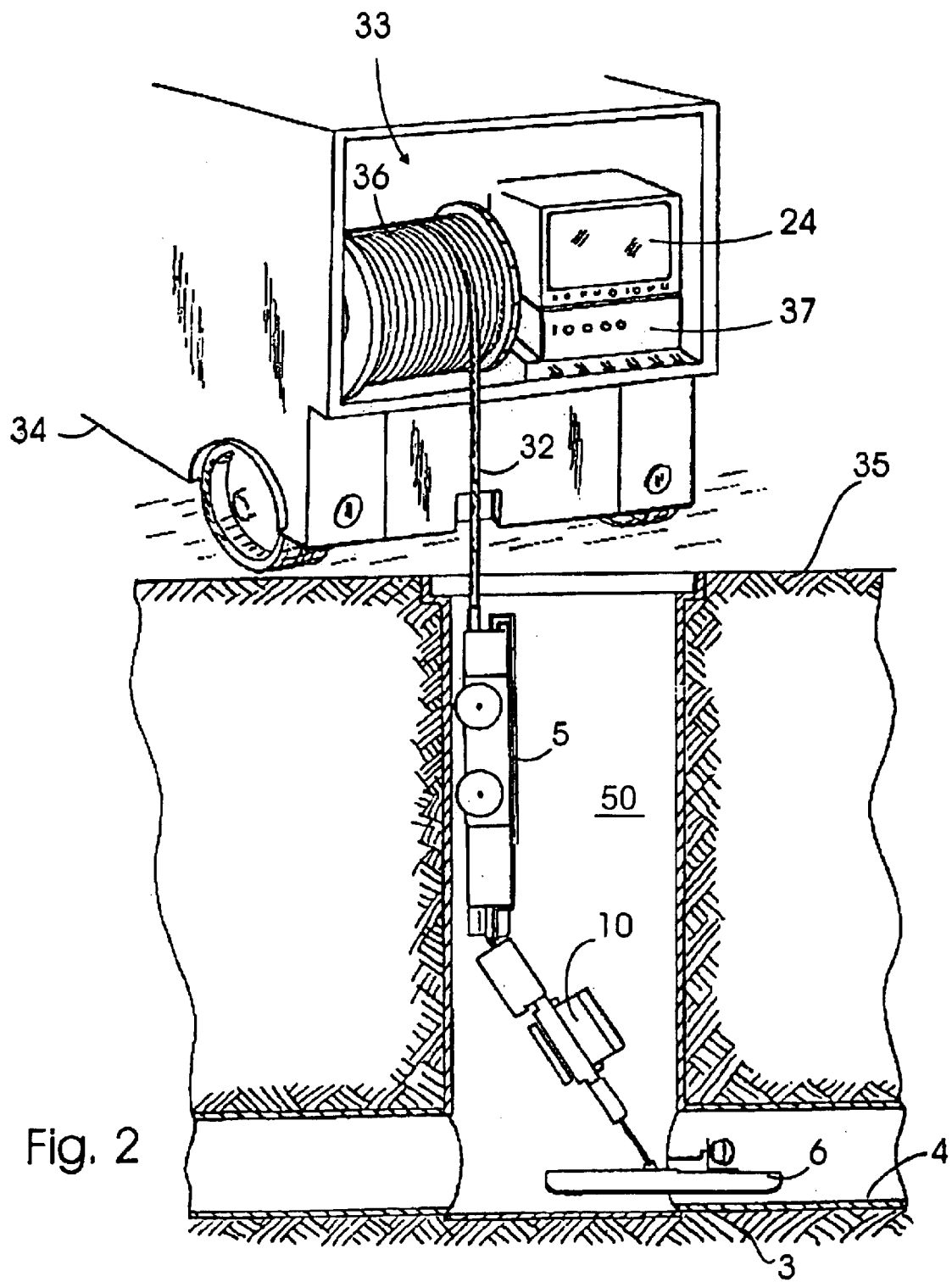
FIG. 2 is a view of the probe during lowering into the pipe via a well.

FIG. 2 shows the station 33 which in this case is located on a vehicle 34 on the ground surface 35. The station comprises a reel 36 equipped with a slip-ring unit (not shown) and serving for the winding-up of the main cable 32, and furthermore a control unit 37 and the television screen 24.

In the case shown, the control unit 37 comprises a signal processor (not shown) for receiving signals from the antenna 10 and generate data representative of the soil 3 around the pipe 4. The data are shown graphically on a display (not shown). The images from the video camera 23 are shown on the television screen 24. Alternatively, the signal processor can be placed for example in the instrument box 13 of the probe.

Via a well 50, the probe in FIG. 2 is hoisted down into the pipe 4. Despite the confined space, this maneuver is possible because the probe is divided into joints which during the hoisting-down are turned in relation to each other on the horizontal hinges 16 and 21.

To ensure that the carriage during the hoisting-down gets a good footing upon meeting the pipe 4, it has been made a little heavier in front of than behind the horizontal hinge 21.

While the probe 1 is pulled or pushed through the pipe 4 by the tractor 5, the transmitter/receiver antenna 10 is continuously transmitting radar signals out into the soil surrounding the pipe. The returned signals are emitted by the antenna to the signal processor which converts the signals into data representative of the structure in the soil around the spot where the antenna is located at a given moment. The data are represented graphically on a television screen (not shown).

In FIGS. 1 and 3, the antenna is opposite a void 2 which is disclosed as a deviation from the normal graphic display on the screen 24.

In practice, there will normally be less than 100 m between two wells. The probe is conveyed at a typical rate of between 10 and 25 m/min. (faster and slower rates can occur depending on the purpose of a given inspection). It will therefore typically take the probe between 4 and 10 minutes to travel from one well to the next and during this detect the soil around the pipe between the area currently covered by the antenna.

When the probe has reached the next well, the antenna is turned by means of the gear motor 17 and the belt drive 18 to a new angular position in which the antenna will cover a new area to be detected while the probe is returning to the first well.

Within a modest period of time, area after area around the pipe can in this way successively be inspected for voids until the soil has been inspected in a total circumference of 360°.

In the example shown in the drawing, there is only one antenna. Within the scope of the invention, the probe can of course be operating with two or more antennas whereby the amount of time spent on inspecting the soil around the pipe can be reduced in a ratio almost inversely proportional to the number of antennas used. Among other things, the number of antennas used will depend on the dimensions of the pipe.

However, the design and mode of operation of the probe do not require it to be provided with a large number of closely set antennas. According to the invention, the antennas on the probe can be placed so that they have such a mutual spacing and angle/angling that they satisfy the demands of a given inspection in the best possible way.

Depending on the distance of the antennas to the inside face of the pipe and the area/soil volume which is desired covered by the individual antenna in a given arrangement, the cushion used on this antenna can be made larger or smaller.

In practice, it has turned out that the leaks often are found at the joint between two pipe sections. The probe according to the invention has the advantage in that it in such places can turn the antenna slowly around along the inside face of the pipe until possible failures or leaks have been found selectively and a precise picture of the situation on the spot has been registered.

Correspondingly, it is possible selectively to map the wall and inside face of the pipe together with damages in the pipe and in joints between two pipes.

In order to be able to obtain comparable data in the angular positions in which the antenna can be turned, the shaft carrying the antenna must have the same axis as the pipe. The exact centring takes place by adjusting the height of the distance piece 15 under the first horizontal hinge 16 and the height of the distance piece 38 under the second horizontal hinge 21. The probe can be adjusted in the same way to fit pipes of different diameters.

In FIG. 3, it is clearly seen that the antenna 10 and the balance weight 11 are mounted on the shaft 7 and that the video cable 26 is passed through the axial hole 27 in the shaft. The shaft, which is made of a nonconductive material such as e.g. fibre glass or PVC, has a round cross section at the bearings 8 and 9 fitting these bearings, and a quadrangular cross section in the antenna section, which is suitable for mounting of the antenna and the balance weight. Alternatively, this mounting can take place by means of fittings that fit the antenna and a round shaft respectively.

The antenna 10 is located at a distance from the inside face 28 of the pipe 4, and the gap formed thereby is, as mentioned earlier, filled with a first cushion 29 serving for improving the connection between the antenna and the pipe.

This improvement is achieved by using a cushion material that ensures that as much as possible of the signal emitted from the antenna will penetrate into the surrounding soil and that the reflexes from the wall of the pipe will be the least possible.

As cushion material, a water-absorbing material in form of a polymer foam 39 can be used that is made to absorb so much water that the cushion material achieves a desired dielectric number.

As an alternative to the sponge material, a mixture of water and polymer in form of a viscous fluid added e.g. polystyrene pellets having closed air-filled pores can also be used as cushion material. The polystyrene pellets are small in relation to the wavelength emitted by the radar antenna.

The dielectric number of the cushion material can e.g. correspond to the dielectric number of the surrounding soil. Alternatively, the cushion can be laminated with inserts of material having a gradually or stepwise increasing dielectric number.

More explicitly, the dielectric number is to be adjusted in relation to parameters such as the distance between the antenna and the pipe wall, the frequency content of the signal from the antenna used, desired dielectric contrast between the material of the cushion and the pipe, and the appearance of the surface reflection from the emitted signal.

The foam 39 is enclosed by a hermetically sealed plastic bag 40 which ensures that the absorbed amount of water remains in the bag and that the desired dielectric number thereby continuously is kept on a constant value.

At least in the section of the bag that is in contact with and is sliding along the uneven and rough inside face of the concrete pipe, the bag is provided with a wearing face 41 of e.g. nylon or similar abrasion-proof material that has a small coefficient of friction.

Several embodiments of the water-absorbing material or foam have been indicated earlier together with the advantages obtained is each case, and need not be repeated here.

The cushion 29 advantageously acts as a dampening mechanical buffer between the antenna and the pipe which both are made of a solid material. The antenna is therefore not or only to a less extent subjected to vibrations and shakes during transportation through the pipe and it is furthermore spared against being physically damaged. The presence of the cushion also means that the probe is not likely to get stuck in the pipe.

In FIG. 3, the probe has registered a void 2 in the soil 3. On this spot, a leak 42 has been made in the pipe wall from the beginning or in the course of time. The void could have been washed out by water which has leaked out of the pipe via this leak, or by water which has leaked into the pipe via the leak together with the dirt in the void.

A second cushion 30 enclosing the shaft 7 in the area at the antenna 10 serves for absorbing radar signals reflected from the pipe wall inside the pipe.

The second cushion 30 is arranged in the same way as the first cushion 29 with a water-absorbing material in form of e.g. a polymer foam 43 enclosed by a hermetically sealed plastic bag 44.

However in this case, the water which is absorbed is a saline solution. The amount of water and salt are matched so that the dielectric number is kept on a suitable low value so that the reflections from the cushion surface are the least possible and penetration and absorption of the signals the greatest possible.

The probe described above and shown in the drawing is provided with one carriage. In some cases, it would be advantageous to use two carriages (not shown).

Instead of the carriage, a loose vehicle with wheels can also be used, the wheels advantageously having treads of a material having small coefficient of friction in order to thereby reduce or eliminate the risk of the vehicle running slantwise or overturning on a slight imbalance.

The invention is described above on the assumption that the probe was operating with a radar.

Within the scope of the invention, other non-destructive detection techniques (various geophysical methods) can be used instead, some of which for example include ultrasound and inductive methods for measuring conductivity, and magnetic measurements.

The detailed description and the drawing also relate to a specific probe for detecting inside e.g. a sewer pipe.

Within the scope of the invention, a probe of the kind described and shown can however also be used for inspecting and measuring a road surfacing or a concrete construction.

The connection between this face and the antenna is improved according to the invention by filling the gap formed with a cushion designed in the same way as the first cushion 29 in FIGS. 1 and 3.

The cushion can advantageously be compressible. By compressing the cushion, the water volume is increased in relation to the air volume, the result of which is that the dielectric number increases. By varying the pressure on the cushion, it will now be possible to determine the dielectric number of the underlying material layer, determine the depth to the subsequent layer boundary and describe some of the physical parameters of the materials.

What is claimed is:

1. A probe for detecting a dielectric medium defined by a dielectric boundary surface and comprising at least one transmitter/receiver antenna located near the surface, a signal processor for receiving signals from the antenna and generating data representative of the structure of the dielectric medium, and a flexible cushion which contains dielectric material and is located between the at least one transmitter/receiver antenna and the surface, wherein the flexible cushion comprises a watertight bag that contains a mixture of air and water in a proportion corresponding to a desired dielectric number and is in contact with the surface or is located near the surface while detection takes place to minimize signal reflexes from the surface.

2. The probe according to claim 1, wherein the bag is provided with a wearing face of an abrasion-proof material at least in portions which, during detection, are in contact with or sliding along the surface.

3. The probe according to claim 1, wherein the water in the bag is mixed with a polymer for providing a gelatinous consistency.

4. The probe according to claim 3, wherein the water is present as a solution that includes a salt therein.

5. The probe according to claim 1, wherein the bag includes therein a porous material for absorbing at least a portion of the water.

6. The probe according to claim 5, wherein the water-absorbing material is a plastic or rubber foam having an open cell structure.

7. The probe according to claim 1, wherein the bag includes therein a material having a capillary structure for absorbing at least a portion of the water.

8. The probe according to claim 1, wherein the bag also contains plastic pellets to increase the viscosity of the water therein.

9. The probe according to claim 1, wherein the dielectric material has a dielectric number that is greater than that of the air but smaller than that of the dielectric medium.

10. The probe according to claim 1, wherein the dielectric material has a dielectric number which is greater than that of the dielectric medium.

11. The probe according to claim 1, which further comprises means for variably compressing the flexible cushion.

12. The probe according to claim 2, wherein the cushion is laminated to provide a stepped or gradual increase of the dielectric number towards the boundary surface.

13. A probe for detecting a dielectric medium defined by a dielectric boundary surface and comprising at least one transmitter/receiver antenna located near the surface, a signal processor for receiving signals from the antenna and generating data representative of the structure of the dielectric medium, and a flexible cushion which contains dielectric material and is located between the at least one transmitter/receiver antenna and the surface and is in contact with the surface or is located near the surface while detection takes place to minimize signal reflexes from the surface, wherein the dielectric medium is located in an area around a dielectric pipe having an inside face that constitutes the dielectric boundary surface, and detection takes place while the probe is guided through the pipe with the at least one transmitter/receiver antenna located on a rotating shaft mounted on the probe having an axis that is essentially the same as that of the pipe, wherein the shaft is journaled in two bearings located on each movable support, with one of the supports being an automotive tractor and the other being a carriage.

14. The probe according to claim 13, wherein the at least one antenna includes a balance weight for counterbalancing the weight of the at least one antenna.

15. The probe according to claim 13, wherein the shaft is divided into two shaft parts arranged to rotate in different directions at the same speed, with at least one first antenna located on the first shaft part and at least one second antenna is located on the second shaft part, and that the first and second antennas being symmetrically arranged about a vertical plane comprising an axis of rotation.

16. The probe according to claim 13, which further comprises at least one horizontally orientated swivel bearing and at least one vertically orientated swivel bearing.

17. The probe according to claim 13, which further comprises an absorbing material located around the shaft and being arranged to absorb signals reflected from the wall of the pipe.

18. A probe for detecting a dielectric medium defined by a dielectric boundary surface and comprising at least one transmitter/receiver antenna located near the surface, a signal processor for receiving signals from the antenna and generating data representative of the structure of the dielectric medium, and a flexible cushion which contains dielectric material and is located between the at least one transmitter/receiver antenna and the surface, wherein the flexible cushion comprises a watertight bag that contains a mixture of gas and liquid in a proportion corresponding to a desired dielectric number and is in contact with the surface or is located near the surface while detection takes place to minimize signal reflexes from the surface.

* * * * *